United States Patent
Kawashima

[11] Patent Number: 6,029,049
[45] Date of Patent: Feb. 22, 2000

[54] WIRELESS SELECTIVE CALL RECEIVER WITH SPEECH NOTICE FUNCTION IN WHICH POWER SUPPLY VOLTAGE IS DETERMINED IN LOADING STATE

[75] Inventor: Shinichi Kawashima, Shizuoka, Japan

[73] Assignee: NEC Corporation, Tokyo, Japan

[21] Appl. No.: 08/868,674

[22] Filed: Jun. 4, 1997

[30] Foreign Application Priority Data

Jul. 26, 1996 [JP] Japan ................................ 8-197516

[51] Int. Cl.[7] ............................................. H04Q 7/18
[52] U.S. Cl. .............................. 455/38.3; 340/825.44; 455/38.2
[58] Field of Search ................. 340/625.44, 311.1; 455/31.1, 31.2, 32.1, 38.1–38.4, 343

[56] References Cited

U.S. PATENT DOCUMENTS

| | | | |
|---|---|---|---|
| 5,274,369 | 12/1993 | Tsunoda et al. | 340/825.44 |
| 5,392,457 | 2/1995 | Davis et al. | 455/38.3 |
| 5,442,345 | 8/1995 | Kwon | 455/38.3 X |
| 5,652,783 | 7/1997 | Keba et al. | 455/31.2 X |
| 5,754,625 | 5/1998 | Shimura | 455/573 X |
| 5,778,312 | 7/1998 | Kawashima | 455/343 |

*Primary Examiner*—William G. Trost
*Attorney, Agent, or Firm*—Whitham, Curtis & Whitham

[57] ABSTRACT

In a wireless selective call receiver with a speech notice function, a receiving section operates based on the power from a power supply section, and receives a radio signal to determine whether an own call number is contained in the received radio signal, and stores a message signal subsequent to the call number in a memory section when it is determined that the own call number is contained in the received radio signal. A speech output section operates based on the power from the power supply section, and outputs the message signal stored in the memory section as a speech output. A voltage determining section operates based on the power from the power supply section, and performs a voltage determination of whether an output voltage of the power supply section is equal to or lower than a predetermined reference voltage, before the speech output from the speech output section. A control section operates based on the power from the power supply section. The control section allows the speech output of the speech output section when it is determined by the voltage determining section that the output voltage of the power supply section is higher than the predetermined reference voltage, and prohibits the speech output of the speech output section otherwise.

18 Claims, 4 Drawing Sheets

WIRELESS SELECTIVE CALL RECEIVER WITH SPEECH NOTICE FUNCTION IN WHICH POWER SUPPLY VOLTAGE IS DETERMINED IN LOADING STATE

BACKGROUND OF THE INVENTION

1. Field of the Invention

The present invention relates to a wireless selective call receiver with a speech notice function, and more particularly to a wireless selective call receiver with a speech notice function in which a power supply voltage is determined in a loading state.

2. Description of the Related Art

In recent years, there is widely used a wireless selective call receiver with a display function in which numeral information and message information are displayed at a liquid crystal display. In addition, a wireless selective call receiver with a speech notice function is also widely used in which a received information is noticed or outputted with speech. Further, as one of the functions of the wireless selective call receiver with a display function and a speech notice function, there is known a speech record function in which a received pattern of specific numerals and/or symbols is displayed as a message sentence and noticed with speech.

Such a wireless selective call receiver with the speech notice function needs a speech synthesis LSI for converting received message information into a speech signal, and an amplifier for amplifying the speech signal such that a speech message can be outputted from a speaker. Also, the wireless selective call receiver with the speech recorder function further needs a microphone, the above speech recording LSI and so on.

By the way, the conventional wireless selective call receiver uses a single dry battery cell as power supply. If the power supply voltage decreases, there is a case where system down occurs during the speech notice of a message. For this reason, the power supply voltage is checked. Such a first conventional wireless selective call receiver is disclosed in Japanese Laid Open Patent Disclosure (JP-A-Heisei 3-203419: the first reference).

FIG. 1 is a block diagram illustrating the structure of a second conventional wireless selective call receiver with a display function (the second reference). Referring to FIG. 1, the conventional wireless selective call receiver is composed of a reception antenna 1, a radio section 2, a decoder control unit 3, a message memory section 4, a display output control unit 5, a display driver 6, a display unit 7, a low voltage determining section 8, a timer 9, a DC/DC converter 10, a power supply section 11, and a reset switch (SW) 12.

The reception antenna 1 receives a radio signal which is transmitted from a base station. The radio section 2 demodulates the radio signal which is received by the reception antenna 1. The decoder control unit 3 compares the demodulated signal A and an own call number of the wireless selective call receiver. When the demodulated signal A is coincident with the own call number, the decoder control unit 3 stores a message signal B subsequent to the call number of the demodulated signal A in the message memory section 4. Also, the decoder control unit 3 outputs a coincidence signal E to the display output control unit 5. The reset switch 12 generates a trigger for starting or stopping the display. The display output control unit 5 issues a control signal F to the message memory section 4 in response to the trigger from the reset switch such that the stored message signal C is sent out to a display driver 6 and displayed on the display unit 7, when the coincidence signal E has been received from the decoder control unit 3. The power supply section 11 composed of a dry battery cell or a charged battery cell of 1.05 V to 1.5 V and the DC/DC converter 10 converts the output voltage of the power supply section 11 into a predetermined voltage. The output voltage of the DC/DC converter 10 is supplied to each of sections of the wireless selective call receiver. The low voltage determining section 8 performs a low voltage determination of the output voltage from the power supply section 11 for every predetermined time interval, using a timer 9. When the output voltage from the power supply section 11 decreases to a value lower than a predetermined level, a signal H indicative of the determining result of the low voltage is outputted from the low voltage determining section 8 to the display output control unit 5. In this case, a low voltage caution operation is started.

In the conventional wireless selective call receiver as described above, the low voltage determination of the battery cell of the power supply section 11 is performed in the state of almost no load. On the other hand, in the wireless selective call receiver with the speech notice function described in the first reference, a received message signal is processed by a speech synthesis LSI and an amplifier is driven such that a speech of message is outputted from a speaker. At this time, current of a few of hundreds milliamperes flows. Therefore, if the message notice is performed as soon as the message signal is received, there is the possibility that any system down occurs before the low voltage determination is performed by the low voltage determining section. Especially, when a used battery cell of a high internal resistance is put into the wireless selective call receiver through cell exchange, the normal voltage is outputted for a moment and the receiver starts the operation. However, the battery cell voltage decreases abruptly to a value lower than the operation limit voltage of the DC/DC converter 10 when a speech notice is started. Therefore, it is expected that system down occurs.

SUMMARY OF THE INVENTION

The present invention is accomplished to solve the above-mentioned problems. An object of the present invention to provide a method of preventing system down when a message is notified with speech and a wireless selective call receiver with a speech notice function.

In order to achieve an aspect of the present invention, a wireless selective call receiver with a speech notice function includes a memory section, a power supply section for supplying power, a receiving section operating based on the power from the power supply section, for receiving a radio signal, for determining whether an own call number is contained in the received radio signal, and for storing a message signal subsequent to the call number in the memory section when it is determined that the own call number is contained in the received radio signal, a speech output section operating based on the power from the power supply section, for outputting the message signal stored in the memory section as a speech output, a voltage determining section operating based on the power from the power supply section, for performing a voltage determination of whether an output voltage of the power supply section is equal to or lower than a predetermined reference voltage, before the speech output from the speech output section, and a control section operating based on the power from the power supply section, for allowing the speech output of the speech output section when it is determined by the voltage determining section that the output voltage of the power supply section is higher than the predetermined reference voltage, and for prohibiting the speech output of the speech output section when it is determined by the voltage determining section that the output voltage of the power supply section is equal to or lower than the predetermined reference voltage.

The voltage determining section includes a first timer for counting a first predetermined time period from generation of a speech output instruction, and performs the voltage determination after the first time period elapses from the generation of the speech output instruction. In this case, the voltage determining section includes a second timer for generating a timing signal for every second predetermined time period which is longer than the first time period, and a determining section for performing the voltage determination in response to the timing signal. The voltage determining section activates the second timer in a state other than the speech output, and activates the first timer and inactivates the second timer in a state of the speech output, and inactivates the first timer and activate the second timer after the first time period elapses.

The voltage determining section performs the voltage determination in a state in which a substantially same load as in the speech output is connected to the power supply section. When the speech output section includes an amplifier for driving a speaker, the voltage determining section performs the voltage determination in a state in which the power is supplied from the power supply section to the amplifier. In this case, the control section electrically disconnects the amplifier from the power supply section when it is determined by the voltage determining section that the output voltage of the power supply section is equal to or lower than the predetermined reference voltage.

When the power supply section includes a battery section, and a DC/DC converter for converting an output voltage of the battery section into a predetermined voltage to supply to the receiving section, the speech output section, the voltage determining section, and the control section, the voltage determining section performs the voltage determination to the output voltage of the battery section. In this case, a minimum operation guarantee voltage of the DC/DC converter is lower than the reference voltage.

In order to achieve another aspect of the present invention, a method of preventing system down in a wireless selective call receiver with a speech notice function includes the steps of:

receiving a radio signal;

determining whether an own call number is contained in the received radio signal;

storing a message signal subsequent to the call number in a memory section when it is determined that the own call number is contained in the received radio signal;

outputting the message signal stored in the memory section as a speech output;

performing, in response to a speech output instruction, a voltage determination of whether an output voltage of a power supply section is equal to or lower than a predetermined reference voltage, before the speech output;

allowing the speech output when it is determined that the output voltage of the power supply section is higher than the predetermined reference voltage; and prohibiting the speech output of the speech output section when it is determined that the output voltage of the power supply section is equal to or lower than the predetermined reference voltage.

In order to achieve still another aspect of the present invention, a wireless selective call receiver with a speech notice function includes a memory section, a power supply section for supplying power, a receiving section operating based on the power from the power supply section, for receiving a radio signal, for determining whether an own call number is contained in the received radio signal, and for storing a message signal subsequent to the call number in the memory section when it is determined that the own call number is contained in the received radio signal, a speech output section operating based on the power from the power supply section, and including an amplifier and a speaker, for outputting the message signal stored in the memory section as a speech output, a voltage determining section operating based on the power from the power supply section, for performing a voltage determination of whether an output voltage of the power supply section is equal to or lower than a predetermined reference voltage, before the speech output from the speech output section, and a control section operating based on the power from the power supply section, for allowing the speech output of the speech output section when it is determined by the voltage determining section that the output voltage of the power supply section is higher than the predetermined reference voltage, and for prohibiting the speech output of the speech output section when it is determined by the voltage determining section that the output voltage of the power supply section is equal to or lower than the predetermined reference voltage.

DESCRIPTION OF THE PREFERRED EMBODIMENTS

Next, a wireless selective call receiver with a speech notice function of the present invention will be described with reference to the accompanying drawings.

Figure 1:
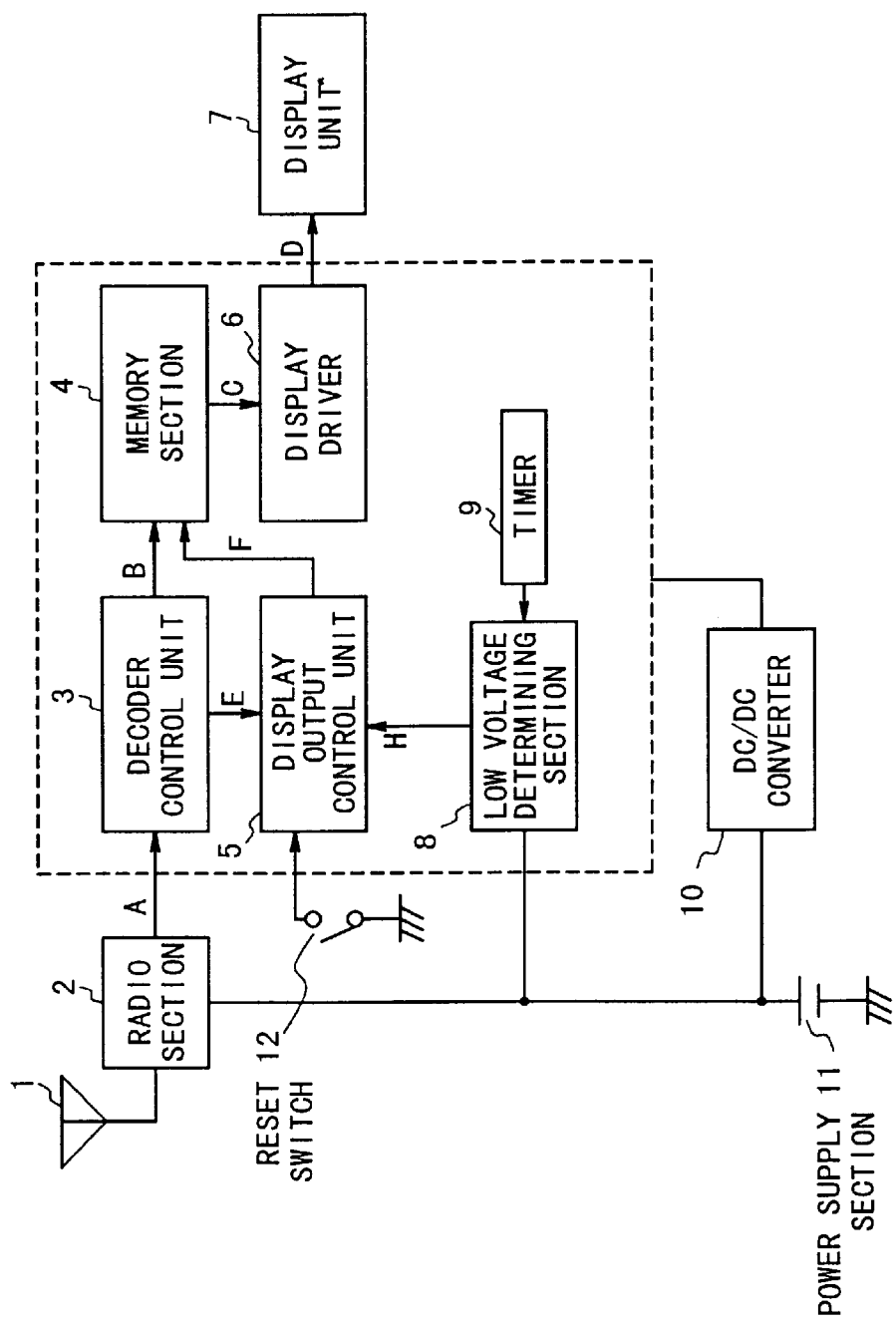
FIG. 1 is a block diagram illustrating the structure of a conventional wireless selective call receiver.
Figure 2:
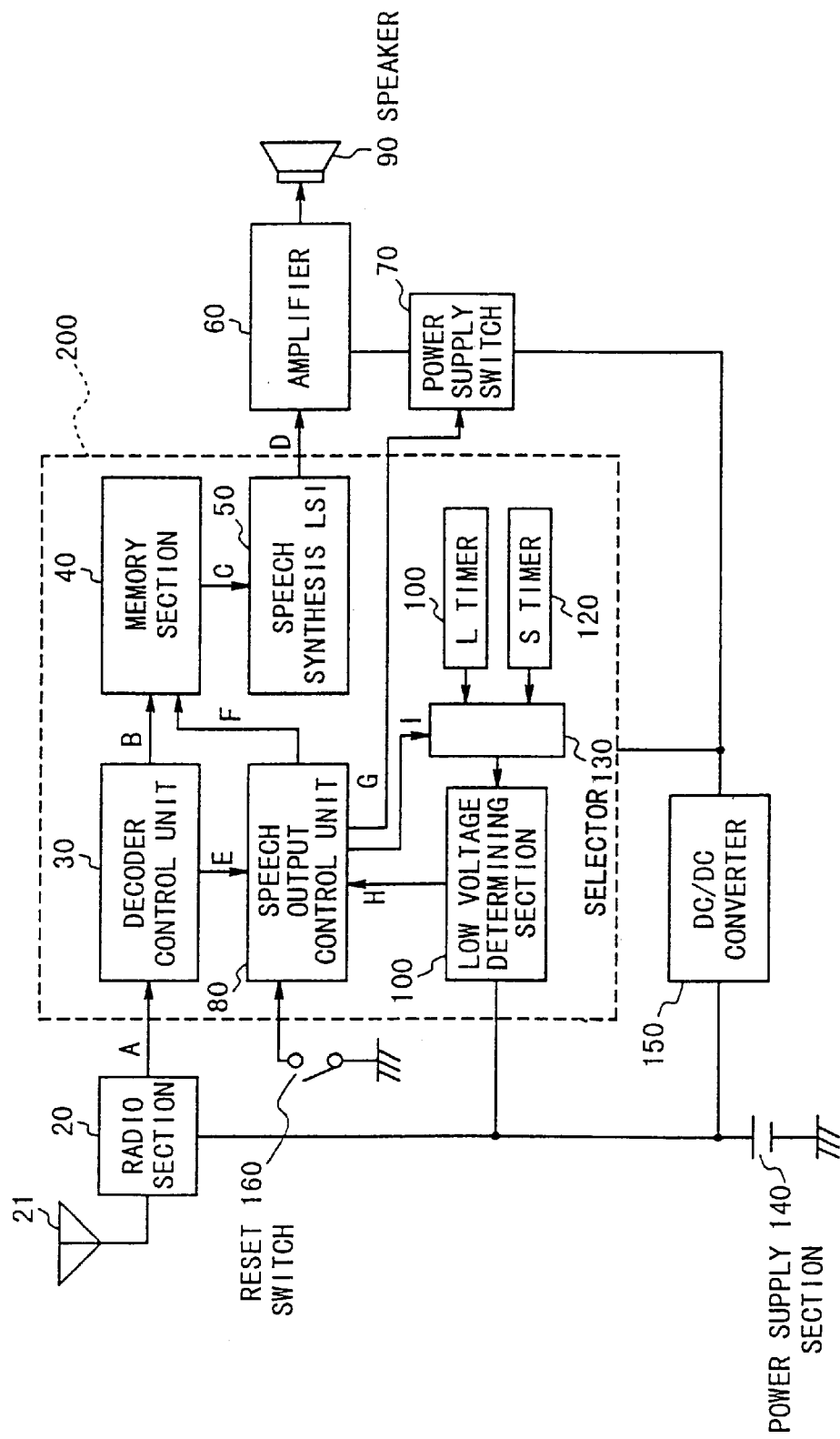
FIG. 2 is a block diagram illustrating the structure of a wireless selective call receiver according to an embodiment of the present invention.

FIG. 2 is a block diagram illustrating the structure of the wireless selective call receiver according to an embodiment of the present invention. Referring to FIG. 2, the wireless selective call receiver with a speech notice function of this embodiment is composed of a reception antenna 21, of a radio section 20, a control section 200, an amplifier 60, a speaker 90, a power supply switch 70, a DC/DC converter 150, a power supply section 140, and a reset switch (SW) 160. The control section 200 is composed a decoder control unit 30, a memory section 40, a speech output control unit 80, a speech synthesis LSI 50, a low voltage determining section 100, a selector 130, a L timer 110, and an S timer 120.

The reception antenna 21 receives a radio signal which is transmitted on a radio channel from a base station which is not illustrated, and the radio section 20 demodulates the received radio signal to output a demodulated signal A to the decoder control section 30. The decoder control unit 30 connected to the radio section 20 compares a call number in the demodulated reception signal A with a predetermined own call number of the wireless selective call receiver. When both are coincident with each other, the decoder control unit 30 outputs a call number incidence signal E to the speech output control section 80. Also, the decoder control unit 30 takes in a message signal B of the demodulated reception signal A subsequent to the call number, and stores in the memory section 40.

The speech synthesis LSI 6 includes a speech data table which previously stores a speech data such as a figure, a letter, and a predetermined form sentence to be actually outputted with speech in correspondence to a data number. The speech output control section 80 generates a control signal F in response to the operation of the reset switch 160 to supply to the memory section 40. At this time, the speech output control section 80 analyzes the message signal B stored in the memory section 40 to generate data numbers for the speech data table from the message signal B. Then, the speech output control section 80 combines the data numbers to form a message data C. The combined data numbers are supplied to the speech synthesis LSI 6. The speech synthesis LSI 50 refers to the speech data table to convert the message signal C into a speech signal D and supplies the speech signal D to the amplifier 60. The amplifier 60 amplifies the speech signal D. As a result, a message speech is outputted the speaker 90.

The L timer 110 is a timer which has a relatively long time period and the S timer 120 is a timer which has a relatively short time period. The speech output control section 80 generates a selection control signal I in response to the operation of the reset switch 160. The selector 130 selects one of the output of the L timer 110 and the output of the S timer 120 in accordance with the selection control signal I from the speech output control section 80. The output of the selected timer is supplied to the low voltage determining section 100.

The low voltage determining section 100 determines whether or not the power supply voltage of a battery cell of the power supply section 140 decreases to a value equal to or lower than a predetermined value. When the power supply voltage decreases to the value equal to or lower than the predetermined value, the low voltage determining section 100 generates a determination result signal H to supply to the speech output control section 80. The speech output control section 80 outputs a power supply control signal G to the power supply switch 70 in response to the power supply control signal G.

The power supply section 140 is composed of a battery cell to supply each of the sections of the wireless selective call receiver with the power supply voltage. The DC/DC converter 150 receives the voltage supplied from the power supply section 140 to generate and supply a predetermined voltage to the control section 200 and the power supply switch 70. The power supply switch 70 controls the power supply from the DC/DC converter 150 in response to the power supply control signal G.

Next, the operation of the wireless selective call receiver will be described with reference to FIG. 3.

Figure 3:
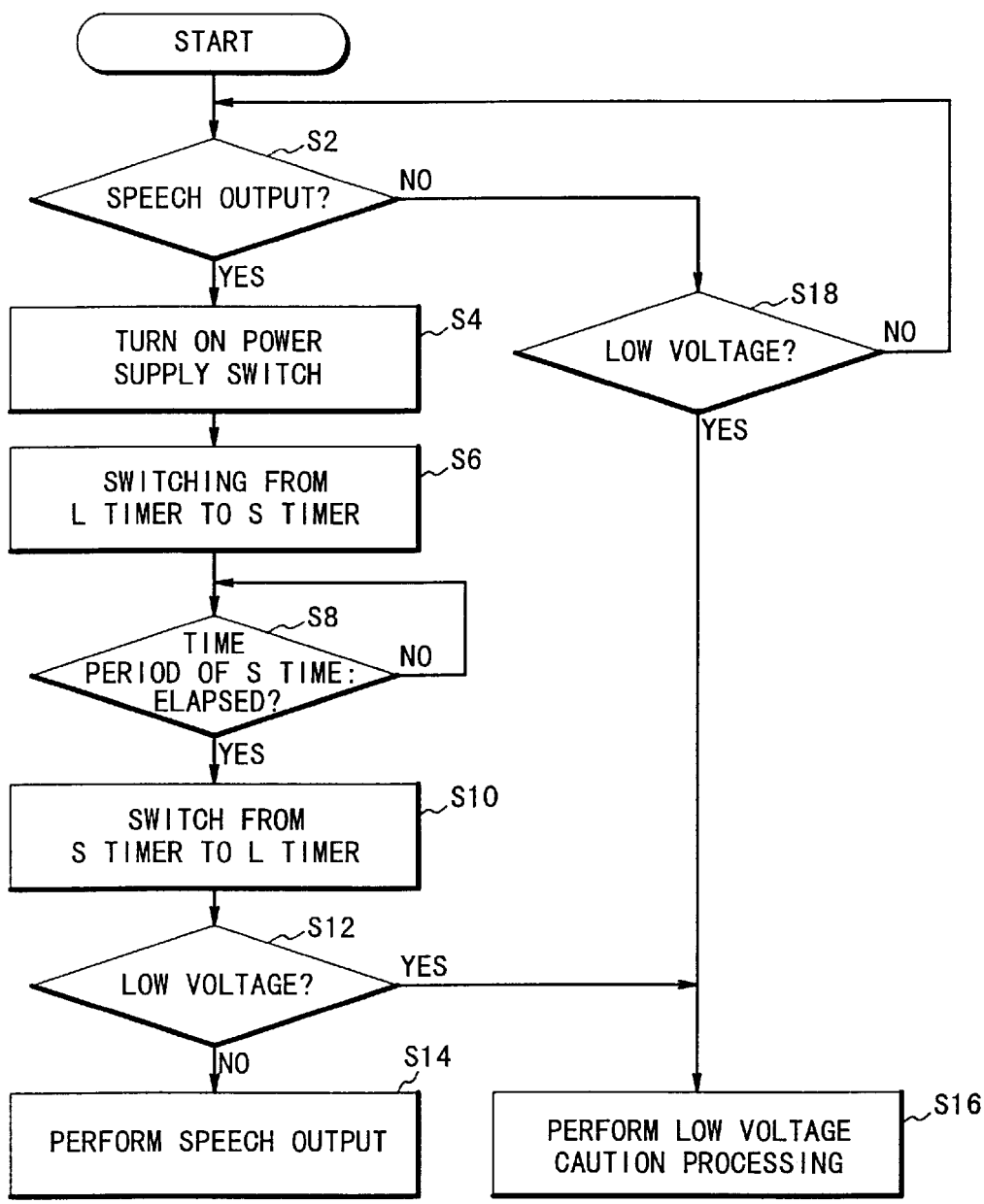
FIG. 3 is a flow chart to described the operation of the wireless selective call receiver according to the embodiment of the present invention.
Figure 4:
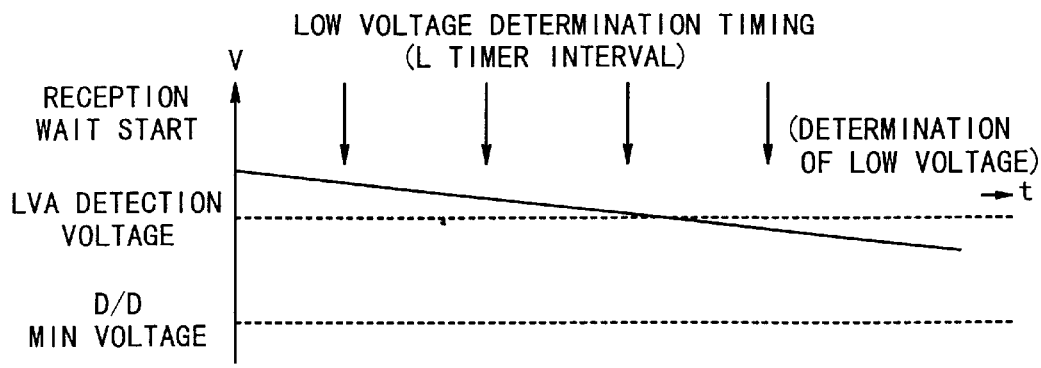
FIG. 4 is a diagram to describe the timings of low voltage determination processing of a power supply voltage in a reception waiting state.

Referring to FIG. 3, in a case where any speech output is not performed (No in a step S2), the speech output control section 80 outputs the selection control signal I to the selector 130 such that the L timer 110 is selected. The L timer 110 generates a timing signal for ever predetermined time period which is relatively long, as shown in FIG. 4. The timing signal is supplied to the low voltage determining section 100 through the selector 130. In a step S18, the low voltage determining section 100 performs the determination of whether the output voltage of the power supply section 140 is equal to or lower than a predetermined low voltage determination value, e.g., a LVA detection voltage of 1.2 V), in response to the timing signal from the L timer 110. When the output voltage of the power supply section 140 is higher than the predetermined low voltage determination value, the DC/DC converter 150 operates in the normal state to supply the converted power supply voltage to each section of the wireless selective call receiver. On the other hand, when the output voltage of the power supply section 140 is equal to or lower than the predetermined low voltage determination value, the low voltage determining section 100 generates low voltage determination signal H. In a step S16, the speech output control section 80 performs a low voltage caution processing such that a caution notice indicative of the end of battery lifetime is outputted. The caution notice may be performed by lighting an LED or by displaying a caution message when the wireless selective call receiver includes a display unit and a driver therefor.

In this case, the minimum operation guarantee voltage of the DC/DC converter 150 is lower than the low voltage determination value. Therefore, even if it is determined that the output voltage of the power supply section 140 is equal to or lower than the predetermined low voltage determination value, the DC/DC converter 150 can correctly operate and the low voltage caution processing can be performed.

When the message signal B is stored in the memory section 40 and the reset switch 160 is operated, it is determined to be YES in the step S2. At this time, the speech output control section 80 outputs the power supply control signal G to the power supply switch 70. As a result, in a step S4, the power supply switch 70 is turned on such that the converted power supply voltage from the DC/DC converter 150 is supplied to the amplifier 60. That is, the amplifier 60 is connected to the power supply section 140 via the DC/DC converter 150 as a load. In a step S6, the speech output control section 80 outputs the selection control signal I to the selector 130. The selector 130 switches the timer to be used from the L timer 110 to the S timer 120 in response to the selection control signal I. In a step S8, it is determined whether the relatively short time period of the S timer 120 is counted. When the relatively short time period elapses, the control goes to a step S10. In the step S10, the speech output control section 80 outputs the selection control signal I to the selector 130 to select the L timer 110 in place of the S timer 120. At the same time, the low voltage determining section 100 performs the low voltage determination processing (step S12).

In the step S12, when it is determined by the low voltage determining section 100 that the power supply voltage decreases to a value lower than the low voltage determination value, the step S16 is executed which is as described above.

On the other hand, when it is determined by the low voltage determining section 100 that the power supply voltage is a value higher than the low voltage determination value, a step S14 is executed to perform the speech output of the message signal B stored in the memory section 40.

In the speech output of the message signal B, the speech output control section 80 analyzes the message signal B stored in the memory section 40 to generate data numbers for the speech data table from the message signal B. Then, the speech output control section 80 combines the data numbers to form a message data C. The combined data numbers are supplied to the speech synthesis LSI 50. The speech synthesis LSI 50 refers to the speech data table to convert the message signal C into a speech signal D and supplies the speech signal D to the amplifier 60. As a result, a message is output from the speaker 90 with speech.

Figure 5:
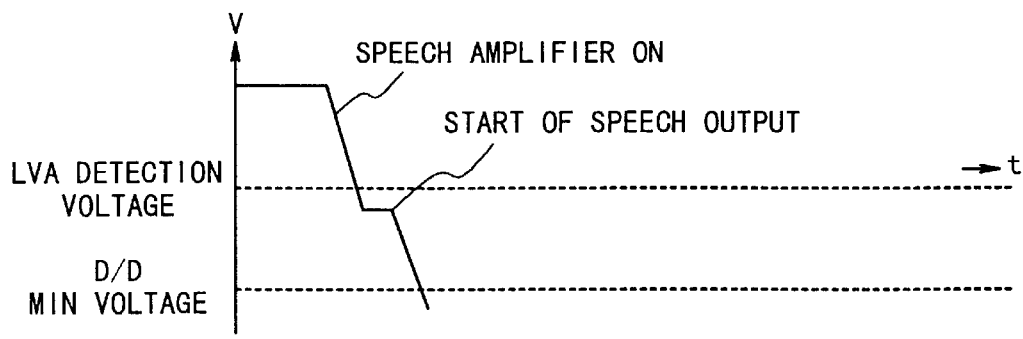
FIG. 5 is a diagram to describe decrease of the power supply voltage at speech output of a message when a used battery cell is used.

One of the features of the present invention is in the control timings of the speech output control unit 80 and the low voltage determining section 100 when the speech output is to be performed. When the reception message which has been stored in the memory section 40 is notified by speech, the power supply switch 70 is controlled by the speech output control unit 80 such that the switch 70 is turned ON to supply the converted power supply voltage from the DC/DC converter 150 to the amplifier 60. If the speech output is performed by the speech synthesis LSI 50 at once, the voltage value of the power supply section 140 decreases rapidly to a value equal to or lower than the input voltage minimum value (LVA detection voltage) and then the D/D min voltage of 1.05 V, when a used battery cell having a large internal resistance is put into the power supply section 140, as shown in FIG. 5. When the power supply voltage of the power supply section 140 decreases to the value lower than the D/D min voltage, because the operation of the DC/DC converter 150 is not guaranteed, the low voltage caution processing can not be correctly performed. That is, there is the possibility that system down occurs.

Figure 6:
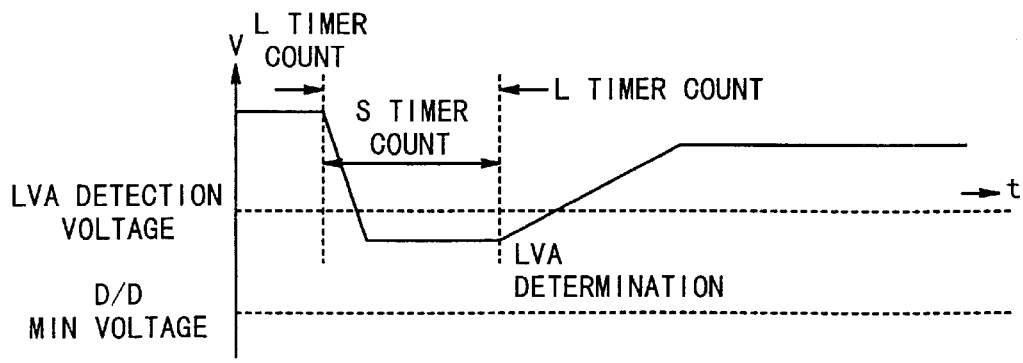
FIG. 6 is a diagram to describe the timing of the low voltage determination processing of the power supply voltage at the speech output when a normal battery cell is used.

Therefore, in the present invention, the power supply to the amplifier 60 is performed, and the timer to be used is switched from the L timer 110 to the S timer 120 in response to the switching control signal I at the same timing. After that, after the short time period of the S timer 120 elapses, the timer to be used is returned to the L timer 110. At that timing, the determination of whether or not the power supply voltage of the power supply section 140 is in a low voltage state is performed by the low voltage determining section 100 to output the low voltage determination signal H to the speech output control unit 80. The switching of the timer is performed to impose a load to the power supply section 140 via the DC/DC converter 150. Thus, even if the power supply voltage decreases when the power supply of the amplifier 60 is turned ON, as shown in FIG. 6, the low voltage caution processing can be performed because the D/D min voltage is set to a lower value than the LVA detection voltage. That is, the load when the power supply to the amplifier 60 is turned ON by the power supply switch 70 is adjusted such that the power supply voltage meets (is equal to or higher than) the input minimum value of the DC/DC converter 150 in the speech output. In this way, the low voltage determination is sufficient to be performed at only one point.

The speech output control unit 80 checks the low voltage determination signal H. The speech output control unit 80 sends a message notice control signal F to the memory section 40 if the voltage of the power supply section 140 is normal such that the reception message data C can be outputted. As a result, the speech output is started from the speech synthesis LSI 50.

By the way, when it is determined th at the current state is in the low voltage state, the low voltage caution processing is performed in which the power supply to the amplifier 60 is turned OFF to stop the speech output. FIG. 4 shows a state in which the power supply voltage which downed once below the low voltage determination value (LVA detection voltage) recovers a value higher than the low voltage determination value by stopping a speech output.

The receiver of this example has only an speech output means as output means for the reception message. However, note that the display means like the conventional one can be used.

As described above, in the case of an speech output, the wireless selective call receiver of this example with the speech notice function performs the determination of whether or not the power supply voltage is in a low voltage state by the low voltage determining section, after a predetermined time period elapses from when the power supply of the amplifier is turned on. By this, it is possible to make the wireless selective call receiver be stable without changing the lifetime of the battery cell in reception wait state in which the speech output is not performed.

As described above, according to the present invention, the wireless selective call receiver of this example with the speech notice function is composed of the low voltage determining means for determining whether or not the output voltage of the power supply section decreases from the predetermined value, the speech synthesizing and amplifying means for converting the reception message which has been stored in the memory section into the speech signal, and for amplifying it such that it is outputted as the speech from the speaker, the speech output control means for performing the power supply voltage supply control of the speech synthesizing and amplifying means and an speech output control. Because the output voltage value of the power supply section is determined to perform the execution or stop of the speech output, after the predetermined time period of the S timer elapses from when the supply of the power supply to the speech synthesizing and amplifying means is started, in a case where an speech output is to be performed, it is possible to make a system be stable without changing the lifetime of the battery cell of the power supply section in the reception wait state in which an speech output is not performed. Also, in the wireless selective call receiver which can operate with one battery cell, there is an excellent effect that the system of the wireless selective call receiver in a new field of the wireless selective call receiver with the speech notice function which needs a large current.

What is claimed is:

1. A wireless selective call receiver with a speech notice function comprising:

a memory section;

a power supply section for supplying power;

a receiving section operating based on the power from the power supply section, for receiving a radio signal, for determining whether an own call number is contained in the received radio signal, and for storing a message signal subsequent to the call number in said memory section when it is determined that the own call number is contained in the received radio signal;

a speech output section operating based on the power from the power supply section, for outputting the message signal stored in said memory section as a speech output;

voltage determining section operating based on the power from the power supply section, for determining whether an output voltage of the power supply section is equal to or lower than a predetermined reference voltage, before the speech output from said speech output section; and a control section operating based on the power from the power supply section, for allowing the speech output of said speech output section when it is determined by said voltage determining means that the output voltage of the power supply section is higher than the predetermined reference voltage, and for prohibiting the speech output of said speech output section when it is determined by said voltage determining means that the output voltage of the power supply section is equal to or lower than the predetermined reference voltage, wherein said voltage determining section performs the voltage determination in a state in which a substantially same load as in the speech output is connected to said power supply section.

2. A wireless selective call receiver according to claim 1, wherein said speech output section includes an amplifier for driving a speaker, and wherein said voltage determining section performs the voltage determination in a state in which the power is supplied from said power supply section to said amplifier.

3. A wireless selective call receiver according to claim 2, wherein said control section electrically disconnects said amplifier from said power supply section when it is determined by said voltage determining means that the output voltage of the power supply section is equal to or lower than the predetermined reference voltage.

4. A wireless selective call receiver according to claim 1, wherein said power supply section includes:

a battery section; and a DC/DC converter for converting an output voltage of said battery section into a predetermined voltage to supply to said receiving section, said speech output section, said voltage determining section, and said control section, and wherein said voltage determining section performs the voltage determination to the output voltage of said battery section.

5. A wireless selective call receiver according to claim 4, wherein a minimum operation guarantee voltage of said DC/DC converter is lower than the reference voltage.

6. A wireless selective call receiver with a speech notice function comprising:

a memory section;

a power supply section for supplying power;

a receiving section operating based on the power from the power supply section, for receiving a radio signal, for determining whether an own call number is contained in the received radio signal, and for storing a message signal subsequent to the call number in said memory section when it is determined that the own call number is contained in the received radio signal;

a speech output section operating based on the power from the power supply section, for outputting the message signal stored in said memory section as a speech output;

a voltage determining section operating based on the power from the power supply section, for performing a voltage determination of whether an output voltage of the power supply section is equal to or lower than a predetermined reference voltage, before the speech output from said speech output section; and a control section operating based on the power from the power supply section, for allowing the speech output of said speech output section when it is determined by said voltage determining means that the output voltage of the power supply section is higher than the predetermined reference voltage, and for prohibiting the speech output of said speech output section when it is determined by said voltage determining means that the output voltage of the power supply section is equal to or lower than the predetermined reference voltage, wherein said voltage determining section includes a first timer for counting a first predetermined time period from generation of a speech output instruction, and performs the voltage determination after the first time period elapses from the generation of the speech output instruction.

7. A wireless selective call receiver according to claim 6, wherein said voltage determining section further includes:

a second timer for generating a timing signal for every second predetermined time period which is longer than the first time period; and a determining section for performing the voltage determination in response to the timing signal.

8. A wireless selective call receiver according to claim 7, wherein said voltage determining section activates said second timer in a state other than the speech output, and activates said first timer and inactivates said second timer in a state of the speech output, and inactivates said first timer and activate said second timer after the first time period elapses.

9. A method of preventing system down in a wireless selective call receiver with a speech notice function comprising the steps of:

receiving a radio signal;

determining whether an own call number is contained in the received radio signal;

storing a message signal subsequent to the call number in a memory section when it is determined that the own call number is contained in the received radio signal;

outputting the message signal stored in said memory section as a speech output;

performing, in response to a speech output instruction, a voltage determination of whether an output voltage of a power supply section is equal to or lower than a predetermined reference voltage, before the speech output;

allowing the speech output when it is determined that the output voltage of the power supply section is higher than the predetermined reference voltage; and prohibiting the speech output of said speech output section when it is determined that the output voltage of the power supply section is equal to or lower than the predetermined reference voltage, wherein said step of performing a voltage determination includes performing a voltage determination in a state in which a load for the speech output is connected.

10. A method of preventing system down in a wireless selective call receiver with a speech notice function comprising the steps of:

receiving a radio signal;

determining whether an own call number is contained in the received radio signal;

storing a message signal subsequent to the call number in a memory section when it is determined that the own call number is contained in the received radio signal;

outputting the message signal stored in said memory section as a speech output;

performing, in response to a speech output instruction, a voltage determination of whether an output voltage of a power supply section is equal to or lower than a predetermined reference voltage, before the speech output;

allowing the speech output when it is determined that the output voltage of the power supply section is higher than the predetermined reference voltage; and prohibiting the speech output of said speech output section when it is determined that the output voltage of the power supply section is equal to or lower than the predetermined reference voltage, wherein said step of performing a voltage determination includes:

counting a first predetermined time period in response to the speech output instruction to generate a check timing signal after the first time period elapses; and performing the voltage determination in response to the check timing signal.

11. A method according to claim 10, wherein said step of performing a voltage determination includes:

counting a second predetermined time period when the speech output instruction is not generated;

generating the check timing signal for every second predetermined time period; and performing the voltage determination in response to the check timing signal.

12. A method according to claim 10, wherein a substantially same load as in the speech output is connected to said power supply section during the first predetermined time period.

13. A method according to claim 12, wherein a speech output section includes an amplifier for driving a speaker, and wherein said step of performing a voltage determination is executed in a state in which the power is supplied from said power supply section to said amplifier.

14. A method according to claim 13, wherein said prohibiting step includes electrically disconnecting said amplifier from said power supply section when it is determined that the output voltage of the power supply section is equal to or lower than the predetermined reference voltage.

15. A wireless selective call receiver with a speech notice function comprising:

a memory section;

a power supply section for supplying power;

a receiving section operating based on the power from the power supply section, for receiving a radio signal, for determining whether an own call number is contained in the received radio signal, and for storing a message signal subsequent to the call number in said memory section when it is determined that the own call number is contained in the received radio signal;

a speech output section operating based on the power from the power supply section, and including an amplifier and a speaker, for outputting the message signal stored in said memory section as a speech output;

voltage determining means operating based on the power from the power supply section, for performing a voltage determination of whether an output voltage of the power supply section is equal to or lower than a predetermined reference voltage, before the speech output from said speech output section; and a control section operating based on the power from the power supply section, for allowing the speech output of said speech output section when it is determined by said voltage determining means that the output voltage of the power supply section is higher than the predetermined reference voltage, and for prohibiting the speech output of said speech output section when it is determined by said voltage determining means that the output voltage of the power supply section is equal to or lower than the predetermined reference voltage, wherein said voltage determining means performs the voltage determination for the speech output in a state in which the amplifier is connected to said power supply section.

16. A wireless selective call receiver with a speech notice function comprising:

a memory section;

a power supply section for supplying power;

a receiving section operating based on the power from the power supply section, for receiving a radio signal, for determining whether an own call number is contained in the received radio signal, and for storing a message signal subsequent to the call number in said memory section when it is determined that the own call number is contained in the received radio signal;

a speech output section operating based on the power from the power supply section, and including an amplifier and a speaker, for outputting the message signal stored in said memory section as a speech output;

voltage determining means operating based on the power from the power supply section, for performing a voltage determination of whether an output voltage of the power supply section is equal to or lower than a predetermined reference voltage, before the speech output from said speech output section; and a control section operating based on the power from the power supply section, for allowing the speech output of said speech output section when it is determined by said voltage determining means that the output voltage of the power supply section is higher than the predetermined reference voltage, and for prohibiting the speech output of said speech output section when it is determined by said voltage determining means that the output voltage of the power supply section is equal to or lower than the predetermined reference voltage, wherein said voltage determining means includes a first timer for counting a first predetermined time period from generation of a speech output instruction, and performs the voltage determination after the first time period elapses from the generation of the speech output instruction.

17. A wireless selective call receiver according to claim 16, wherein said voltage determining means further includes:

a second timer for generating a timing signal for every second predetermined time period which is longer than the first time period; and a determining section for performing the voltage determination in response to the timing signal.

18. A wireless selective call receiver according to claim 17, wherein said voltage determining means activates said second timer in a state other than the speech output, and activates said first timer and inactivates said second timer in a state of the speech output, and inactivates said first timer and activate said second timer after the first time period elapses.

* * * * *